United States Patent
Cavallaro et al.

(10) Patent No.: US 9,917,468 B2
(45) Date of Patent: Mar. 13, 2018

(54) WEARABLE CHARGING APPARATUS

(71) Applicant: MOTOROLA MOBILITY LLC, Chicago, IL (US)

(72) Inventors: Alberto R. Cavallaro, Northbrook, IL (US); David A. Winkler, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 150 days.

(21) Appl. No.: 14/818,437

(22) Filed: Aug. 5, 2015

(65) Prior Publication Data
US 2017/0040825 A1 Feb. 9, 2017

(51) Int. Cl.
| | | |
|---|---|---|
| *H02J 7/02* | (2016.01) | |
| *H02J 7/00* | (2006.01) | |
| *H02J 7/04* | (2006.01) | |
| *G04G 19/02* | (2006.01) | |
| *H02J 50/10* | (2016.01) | |

(52) U.S. Cl.
CPC .............. *H02J 7/025* (2013.01); *G04G 19/02* (2013.01); *H02J 7/0042* (2013.01); *H02J 7/047* (2013.01); *H02J 50/10* (2016.02)

(58) Field of Classification Search
CPC .......... H02J 7/025; H02J 7/047; H02J 7/0052; H02J 7/04; H02J 7/02; H02J 7/00; H02J 7/0042; H02J 50/10; A61N 1/3787; G04G 19/02
USPC ......................................................... 320/108
See application file for complete search history.

(56) References Cited

U.S. PATENT DOCUMENTS

| | | | | |
|---|---|---|---|---|
| 2004/0105347 A1* | 6/2004 | Fujimori | ................ | G04C 3/008 368/293 |
| 2005/0127866 A1* | 6/2005 | Hamilton | ........... | G06K 7/10891 320/108 |
| 2009/0082835 A1* | 3/2009 | Jaax | ........................ | H02J 7/025 607/61 |
| 2011/0103195 A1* | 5/2011 | Wilbur | ................. | G04B 19/207 368/76 |

(Continued)

OTHER PUBLICATIONS

Mopie, Choose the best battery case for your smartphone, http://www.mophie.com/shop/battery-cases, downloaded from Internet: Apr. 21, 2015, one page.

(Continued)

*Primary Examiner* — Nathaniel Pelton
*Assistant Examiner* — Dung V Bui
(74) *Attorney, Agent, or Firm* — Watson Intellectual Property Group (57) ABSTRACT

A wearable charging apparatus configured for charging of a wearable device while the wearable device is in an operative position, such as on the wrist of the user the wearable charging apparatus includes a front housing portion, a rear charging portion, a coupling member and a charge system. The wearable device is positionable between the front housing portion and the rear charging portion. The front portion has a battery and the rear charging portion has a wearable charge coil that is placed in operable position relative to the wearable device and configured to electrically communicate with a coil within the body of the wearable device and coupled to a wearable battery therewith, to, in turn, transfer power from the battery within the cavity to the wearable battery.

19 Claims, 6 Drawing Sheets

(56) References Cited

U.S. PATENT DOCUMENTS

| | | | |
|---|---|---|---|
| 2014/0232328 A1* | 8/2014 | Pegg | G04C 10/00 320/108 |
| 2015/0085623 A1* | 3/2015 | Modaragamage | A44C 5/24 368/10 |
| 2015/0124566 A1* | 5/2015 | Lake | G04G 21/08 368/10 |
| 2015/0195009 A1* | 7/2015 | Wang | H04B 5/0037 455/573 |

OTHER PUBLICATIONS

Wipowerband, http://www.wipowerband.com, downloaded from Internet: Apr. 21, 2015, one page.

* cited by examiner

WEARABLE CHARGING APPARATUS

CROSS-REFERENCE TO RELATED APPLICATION

NA

BACKGROUND OF THE DISCLOSURE

1. Field of the Disclosure

The disclosure relates in general to charging devices for electronic devices, and more particularly, to a wearable charging apparatus, which is configured to charge the battery of a wearable device, and which can be selectively attachable and detachable without the removal of the wearable device. Although not limited thereto, a smart watch or the like is one such wearable device that can be positioned and attached to the wrist of a user.

2. Background Art

The use of wearable devices has recently increased with the increased focus on electronic devices that can interface with smartphones and which can provide some of the functionality of smartphones while being wearable.

Problematically, such wearable devices are relatively small in size and shape. As one example, a smart watch or the like is generally sized to correspond to or to be close dimensionally to conventional wrist watches. While being relatively diminutive, users have come to expect a number of features, displays, sensors and the like to be offered in such devices. Due to the small size, battery size and capacity is an issue, and often, the battery life is insufficient to last through an entire day, or through periods of heavy use for an extended period of time. Moreover, the electrical requirements are relatively large due to the displays and the different features.

Moreover, the preferred method of charging is wireless charging, though, for example, an induction coil that is present in the wearable device. The induction coil is positioned proximate the lower surface of the wearable device that is facing and against the body (i.e., wrist) of the user. Thus, to expose the induction coil and to introduce a charging coil, it is necessary to remove the wearable and to place the wearable on the charger. To overcome some of these drawbacks, solutions have been provided which attach a battery pack to the underside of the wearable between the back of the wearable and the body of the user. Problematically, these often add substantial bulk between the base and the body of the user. In addition, the wearable must be removed to couple and to detach such a battery pack to the wearable.

SUMMARY OF THE DISCLOSURE

The disclosure is directed to a wearable charging apparatus configured for charging of a wearable device while the wearable device is an operative position (such as on a wrist of a user). The wearable device includes a body and a strap portion. The strap portion is coupled to the body and configured to be attachable to a user. The body includes a display face and a back surface opposite the display face.

The wearable charging apparatus comprises a front housing portion, a rear charging portion, a coupling member and a charge system. The front housing portion includes an outer surface and an inner surface. The front housing portion defines a battery cavity and a display void. The rear charging portion has a body with a watch facing surface and an outward surface opposite the watch facing surface. The coupling member has a first end coupled to the front housing portion and a second end coupled to the rear charging portion. The coupling member facilitates the positioning of the front housing portion and the rear charging portion into a spaced apart overlying configuration, wherein the body of the wearable device is positionable therebetween so that the display void overlies the display face of the body and so that the watch facing surface overlies the back surface of the wearable device. The charge system includes a battery positioned within the battery cavity and a wearable charge coil electrically coupled to the battery and positioned on the rear charging portion proximate the watch facing surface and configured to electrically communicate with a coil within the body of the wearable device and coupled to a wearable battery therewith, to, in turn, transfer power from the battery within the cavity to the wearable battery.

In some configurations, the coupling member fixedly couples the front housing portion to the rear housing portion.

In some configurations, the coupling member facilitates at least one of translation and rotation of the front housing portion relative to the rear charging portion.

In some configurations, the coupling member includes at least one hinge which allows for the directing of the front housing portion and the rear housing portion into a substantially coplanar configuration.

In some configurations, the coupling member comprises a flexible member so that the front housing portion is positionable relative to the rear charging portion in a plurality of different orientations.

In some configurations, the wearable charging apparatus further includes a battery charging coil coupled to the battery and structurally configured to electrically communicate with an outside charger to, in turn, charge the battery within the battery cavity.

In some configurations, the rear charging portion includes a shield positioned on the opposite side of the wearable charge coil from the wearable device.

In some configurations, the battery charging coil is collocated with the wearable charge coil, both of which are positioned between the shield and the wearable device.

In some configurations, the battery charging coil is positioned on the opposite side of the shield from the wearable charge coil.

In some configurations, the battery charging coil is positioned on the front housing portion.

In some configurations, the front housing portion is substantially hoop like in configuration, to substantially match the configuration of the display face.

In some configurations, the display void comprises a substantially circular configuration.

In another aspect of the disclosure, the disclosure is directed to a method of using a wearable charging apparatus on a wearable device positioned on a wrist of a user. The wearable device includes a body having a display face and a back surface opposite the display face, and a strap portion coupled to the body and extending around a wrist of a user to couple the wearable device to a user. The method comprises the steps of: providing a wearable charging apparatus, the wearable charging apparatus having a front housing portion, a rear charging portion, a coupling member configured to position the front housing portion in an overlying position relative to the rear charging portion in a spaced apart configuration, and a charging system, the front housing portion having a battery cavity and defining a display void, the rear charging portion having a watch facing surface, and, the charging system including a battery positioned within the battery cavity and a wearable charge coil electrically coupled to the battery and associated with the watch facing surface of the rear charging portion; sliding the rear charging portion of the wearable charging apparatus between the back surface of the body and the wrist of the user so that the watch facing surface corresponds to the back surface, in turn, placing the wearable charge coil proximate thereto; positioning the front housing portion over the display face of the wearable device, so that the display face is visible through the display void; and charging a battery in the wearable through the wearable charge coil.

In some configurations, the step of sliding occurs without the removal of the wearable device from the wrist of the user.

In some configurations, the method further comprises the step of removing the rear charging portion from between the back surface of the body and the wrist of the user without removal of the wearable device from the wrist of the user.

In some configurations, the wearable charging apparatus further includes a battery charging coil electrically coupled to the battery. The method further comprises the steps of: positioning the wearable charging device on an outside charger having a charging coil; and charging the battery of the wearable charging apparatus through the battery charging coil.

In some configurations, the method further comprises the steps of: determining whether the wearable charging apparatus is positioned on a charger or coupled to a wearable device; and selectively activating one of the battery charging coil if the wearable charging apparatus is positioned on a charger, and the wearable charge coil if the wearable charging apparatus is coupled to a wearable device.

In some configurations, the method further comprises the steps of: determining whether the wearable charging apparatus is positioned on a charger or coupled to a wearable device; and limiting the upper temperature of the battery of the wearable charging apparatus to a first temperature if the wearable charging apparatus is positioned on an charger, and limiting the upper temperature of the battery of the wearable charging apparatus to a second temperature if the wearable charging apparatus is coupled to a wearable device, wherein the second temperature is greater than the first temperature.

In some configurations, the method further comprises the step of viewing the display face through the display void.

In some configurations, the method further comprises the step of touching the display face through the display void.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
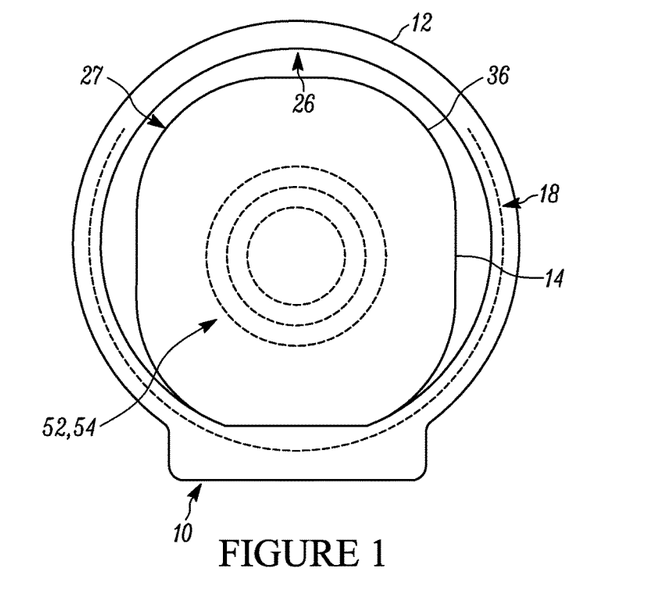
FIG. 1 of the drawings is a top plan view of the wearable charging apparatus of the present disclosure.
Figure 3:
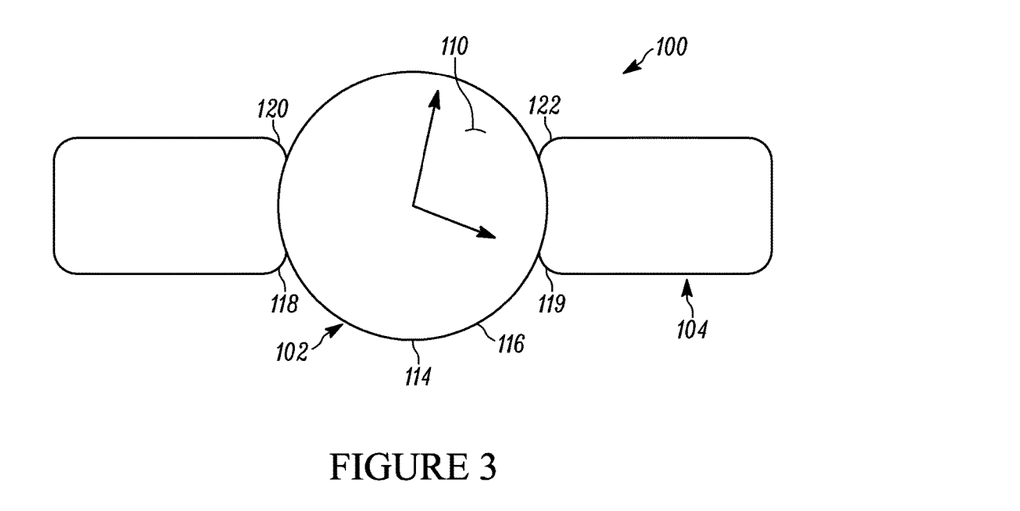
FIG. 3 of the drawings is a top plan view of an exemplary wearable device of the present disclosure.

Referring now to the drawings and in particular to FIG. 1, the wearable charging apparatus is shown generally at 10. The wearable charging apparatus is configured to be utilized with a wearable (wrist watch, wrist device, smart watch, smart glasses, headphones, smart pins, etc.). One such wearable is shown in FIG. 3 generally at 100, and with the wearable coupled thereto in FIGS. 4 and 5. The wearable 100 includes body 102 and strap portion 104. The body portion includes display face 110, back surface 112, and side surface 114. The display face may comprise a digital display, a combination digital and analog display, or the like. The front face defines an outer perimeter 116 that defines the configuration of the display face that displays visible information. The back surface 112 generally has watch coil 115 positioned in proximity therewith so that charging can be effectuated by placement of a charging coil proximate the back surface 112. The side surfaces 114 extend therebetween so as to define a cavity wherein the electronic circuitry and battery are positioned. The side surfaces 114 may include a plurality of buttons, switches, knobs and the like which serve as input devices to the wearable to access or to select certain functions. In addition, the display face may include an input device such as a touch screen or the like.

The body of the wearable device 100 includes a wearable battery positioned within the body and a wearable coil that is positioned proximate the back surface so as to be engageable by a wearable charge coil positioned in close proximity with the back surface. The wearable battery and the wearable coil are electrically coupled together.

Additionally, typically, such a body includes first side coupling 118 and second side coupling 119 on opposing sides which are configured to couple to a strap portion which is utilized to couple the wearable to the wrist or arm of the user. The strap portion includes first joining end 120 and second joining end 122. The first joining end interfaces with the first side coupling of the wearable and the second joining end interfaces with the second side coupling. A clasp or the like can be positioned on the strap portion between the first and second joining ends so as to facilitate adjustment and retention of the strap portion so as to encircle and engage the wrist of the user in releasable engagement.

It will be understood that the wearable is not limited to any particular configuration of the display face as well as any particular configuration of the strap portion. The wearable configuration described and shown is merely for illustrative purposes and shall not form any limitation to the configuration of the charging apparatus. Again, variations to the size, shape, thickness, configuration, capabilities, among other features of the wearable are not limited to the embodiment disclosed.

Referring again to FIGS. 1 and 2, the wearable charging apparatus includes front housing portion 12, rear charging portion 14, coupling member 16 and charging system 18. The front housing portion 12 includes outer surface 20, inner surface 22 and battery cavity 24. The front housing portion is configured to extend over the display face 110 of the wearable device 100. In such a configuration, the inner surface 22 faces the display face 110. The front housing portion 12 defines an outer perimeter 26 defining the outer extents of the housing portion, and a display void 27. The display void 27 provides an opening that facilitates access to the display face both visually and/or tactically. In the configuration shown, the display face defines a hoop like member having a generally circular cross-sectional configuration. The battery cavity can be sized to place a battery of the desired capacity therewithin. As such, the battery cavity comprises a generally cylindrical member that extends between the outer surface 20 and the inner surface 22. In the configuration shown, the hoop like member is sized so that the outer perimeter 26 of the front housing portion substantially corresponds in shape and/or size to the outer perimeter 116 of the wearable device. Additionally, the display void 27 substantially corresponds in shape and/or size to the display face 110 of the wearable device.

It will be understood that in other configurations, the shape of the outer perimeter 26 and the display void 27 can be varied without departing from the scope of the disclosure. For example, the outer perimeter and the display void may comprise complementary or contrasting configurations relative to the shape and size of the body of the wearable device. In addition, various topographical variations and designs and ornamental features are contemplated as well. Further still, the outer perimeter and the inner void can be configured so as not to correspond, and to provide appearance differences relative to the wearable without such a charging apparatus. In other configurations, the display void may comprise a semi-circular component or another configuration that does not fully encircle the display face of the wearable device.

Figure 2:
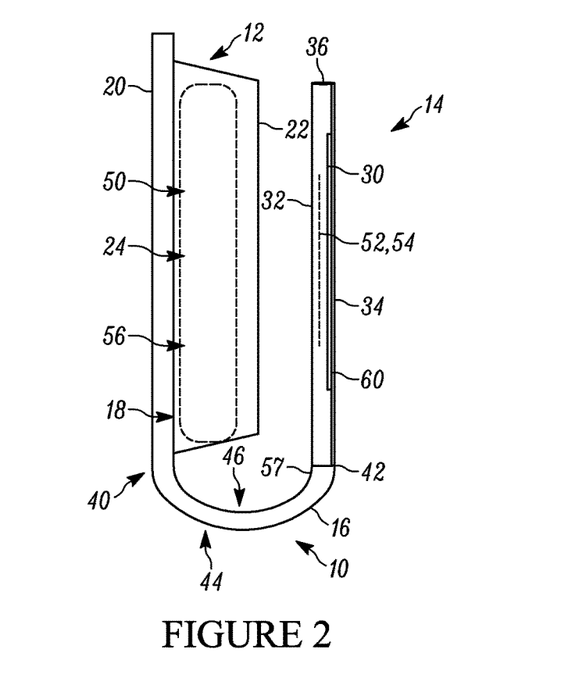
FIG. 2 of the drawings is a side elevational view of the wearable charging apparatus of the present disclosure.

The rear charging portion 14 comprises body 30, watch facing surface 32, outward surface 34 and outer perimeter 36. It will be understood that body 30 is configured to extend over at least a portion of back surface 112 of the wearable device between the back surface and the wrist of the user. Thus, the body 30 is generally substantially thinner than the front charging portion, and may be configured to match the size and shape of the back surface 112. In addition, the back surface may include topography on the outward surface 34 so as to follow or enhance comfort against the wrist of the user.

The watch facing surface 32 is preferably planar along a portion thereof so as to follow the contours of the back surface of the wearable device. It is contemplated that where the wearable device includes sensors and the like that require an unobstructed path to the wrist of the user, the body 14 may include openings that correspond to such sensors and the like. Of course, it will be understood that the shape of the body 30 can be varied to achieve design effects. For example, while the body is shown as being substantially square or rectangular, it is contemplated that the body may include other variations, such as protrusions, variations in thickness, variations in the outer perimeter configuration and the like.

The coupling member 16 is shown as including first end 40 and second end 42 and central portion 44. The coupling member includes a passageway or other provision for the passage of wiring and the like between the front housing portion and the rear charging portion. In some configurations, the coupling member 16 may be integrally formed with portions of the front and rear charging portions 14, 16. That is, the front housing portion, the rear housing portion and the coupling member may comprise a single integrally formed member that is of a substantially rigid material, such as a metal member, or a polymer, for example. The coupling member is configured to position the front housing portion 12 and the rear charging portion in overlying engagement, so that the wearable device can be captured therebetween.

Figure 6:
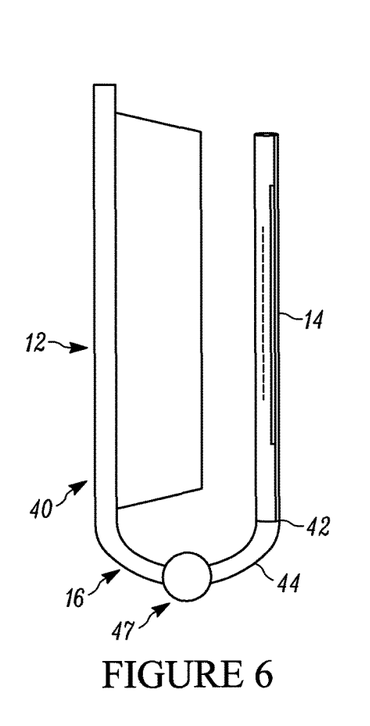
FIG. 6 of the drawings is a side elevational view of the wearable charging apparatus of the present disclosure, showing, in particular, a hinge or pivot in the coupling member to allow for relative rotative position of the front housing portion relative to the rear charging portion.
Figure 7:
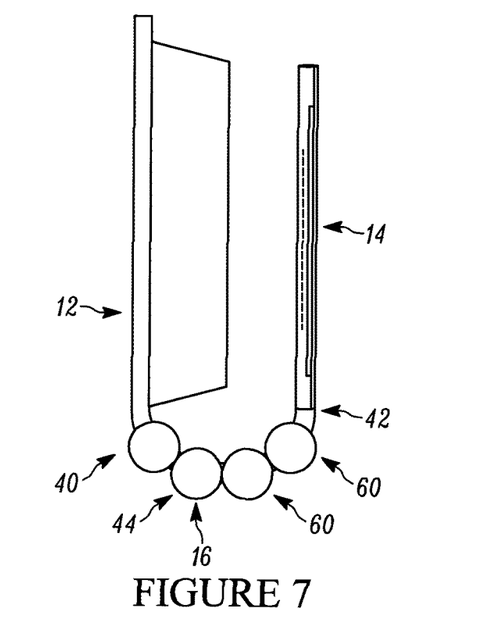
FIG. 7 of the drawings is a side elevational view of the wearable charging apparatus of the present disclosure, showing, in particular, a plurality of hinges and/or pivots and/or a flexible material for the coupling member to allow for relative rotative position of the front housing portion relative to the rear charging portion.
Figure 8:
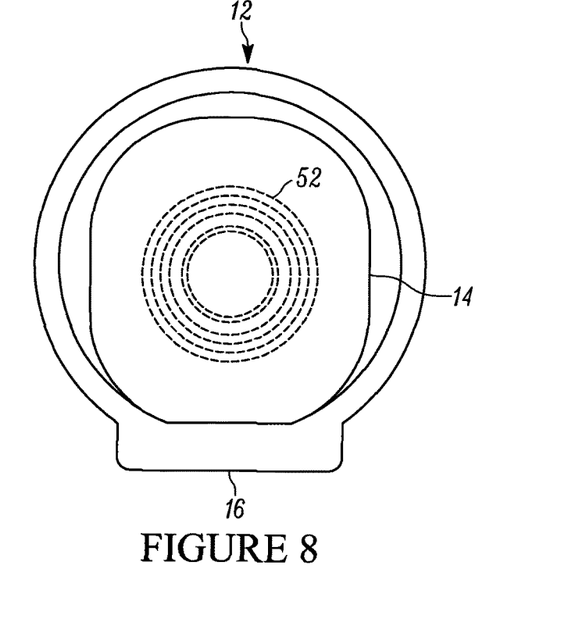
FIG. 8 of the drawings is a top plan view of the wearable charging apparatus of the present disclosure showing, in particular, the wearable charge coil on one side of the shield of the rear charging portion and the battery charge coil on the other side of the shield of the rear charging portion.
Figure 9:
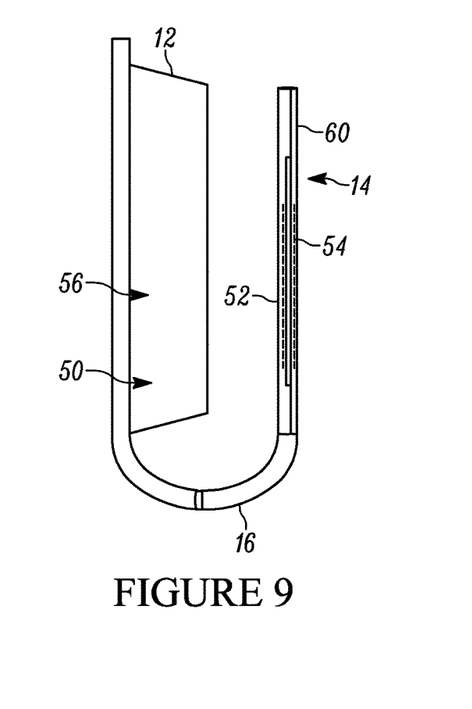
FIG. 9 of the drawings is a side elevational view of the wearable charging apparatus of the present disclosure showing, in particular, the wearable charge coil on one side of the shield of the rear charging portion and the battery charge coil on the other side of the shield of the rear charging portion.

In other configurations, such as the configuration shown in FIG. 6, the coupling member may include a hinge 47 or other flexible member which allows for the relative rotation of the front housing portion and the rear charging portion. For example, the flexible may include a hinge which permits movable positioning into a first position wherein the front housing portion overlies the rear charging portion so as to sandwich the body of the wearable device therebetween, and a second position, which may comprise a lie-flat configuration (such as the configuration shown in FIG. 11 of the wearable charging apparatus in a lie flat configuration, or a rotated configuration wherein the two components are rotated almost 180° so as to fully expose the watch facing surface 32). The configuration may include additional positions therebetween. For example, the hinge may have detents, springs, or other mechanisms that can maintain each of the two configurations disclosed. In other configurations, the device may have an infinite number of configurations between the first position and the second position, wherein force is required to direct the coupling member into the desired configuration, whereupon release of the force leaves the coupling member in the set position. One such configuration having multiple hinges is shown in FIG. 7.

In still other configurations, the coupling member may comprise a flexible member with some resilience such as a wire frame, or a flexible sheet material that can plastically deform and retain shape upon deformation. In still other configurations, the coupling member may comprise a fully flexible material (such as a fabric or woven material based member, a polymer member or the like). In such a configuration, a locking clasp or other member (such as a cooperative magnet, a fastener or the like) may couple the front housing portion to the rear housing portion proximate a side opposite the coupling member (or spaced apart from the coupling member).

The charge system 18 is shown in FIGS. 1 and 2 as comprising battery 50, wearable charge coil 52, battery charge coil 54, control circuitry 56 and wiring 57. In the configuration shown, the battery 50 is positioned within the battery cavity 24. The size of the battery or the configuration of the battery that is included in the battery cavity can be varied without departing from the scope of the disclosure. It is contemplated that the battery cavity may include multiple compartments which may be adjacent or which may be spaced apart. Batteries may be positioned in each of the compartments, wherein the batteries are coupled, preferably, to each other. It will be understood that the battery may comprise a series of individual cells that are coupled together about terminals (i.e., stacked together, for example).

The wearable charge coil 52 comprises a power transmission coil. The wearable charge coil 52 is positioned so as to be in close proximity to the watch facing surface 32 of the rear charging portion 14. In such a configuration, the wearable charge coil 52 can be in electrical communication with the battery maintained within the body 102 of the wearable device. A shield can be positioned on the opposite side of the wearable charge coil 52 from the watch facing surface (that toward the outward surface of the rear charging portion). It will be understood, and will be explained below, that the wearable charge coil 52 is structurally configured to provide electrical power to the battery of the wearable device, to, in turn, recharge the same.

The battery charge coil 54 is shown in FIG. 1 as comprising a power receiving coil configured to receive electrical power to recharge the battery 50. The battery charge coil can be combined with the wearable charge coil. In other configurations, the battery charge coil can be positioned between the shield 60 and the outward surface 34 of the rear charging portion. In other configurations, the battery charge coil may be positioned on, for example, the front housing portion, such as on the outer or inner surface thereof. It will be understood that some shielding may be required so that the wearable charge coil and the battery charge coil do not interfere with each other. In another configuration, the battery charge coil can be eliminated, and a charging port (i.e., a mini usb port or the like) can be provided to charge the battery within the battery cavity when not in use. In another configuration, the battery positioned within the battery cavity may comprise a replaceable battery, or a battery that requires removal for charging. In such a configuration, the battery cavity is accessible, and permits removal of the battery. And, in such a configuration, a charging port or other charging facility can be removed from the wearable charging apparatus.

It will be understood that the position of the wearable charge coil and the battery charge coil may depend on the manner of charging, as well as the configuration of the device, and, for example, the configuration of the coupling member. Such differences will be described below with respect to different charging mechanisms.

The control circuitry 56 may be positioned on either one or both of the front housing portion and the rear housing portion. The control circuitry may likewise be positioned on the coupling member. In the configuration shown, the control circuitry is maintained within the battery cavity. The control circuitry, the battery, and the wearable and battery charge coils are coupled together through conductive wire that extends through or along various of the components including the coupling member.

Figure 10:
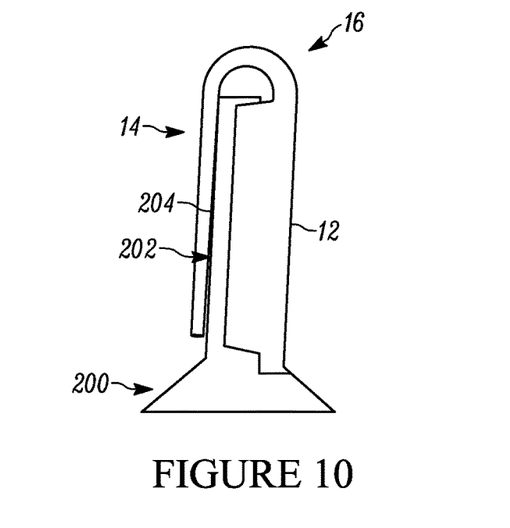
FIG. 10 of the drawings is a side elevational view of an exemplary wearable charging apparatus positioned in an operable charging orientation within a charger.

To charge the battery 50, the wearable charging apparatus is coupled to an outside charger. Such a charger may comprise the charger shown in FIG. 10 at 200. With such a charger, a body 202 is provided having a charging coil 204 therein. The wearable charging apparatus is directed so as to sandwich the charging coil therebetween. In the configuration wherein the battery charge coil is combined with the wearable charge coil, or wherein the battery charge coil is positioned on the inner surface 22 of the front housing portion, when in the charger shown, the battery charge coil is in close proximity to the charger coil wherein power can be transferred therebetween, to, in turn, charge the battery 50.

Figure 11:
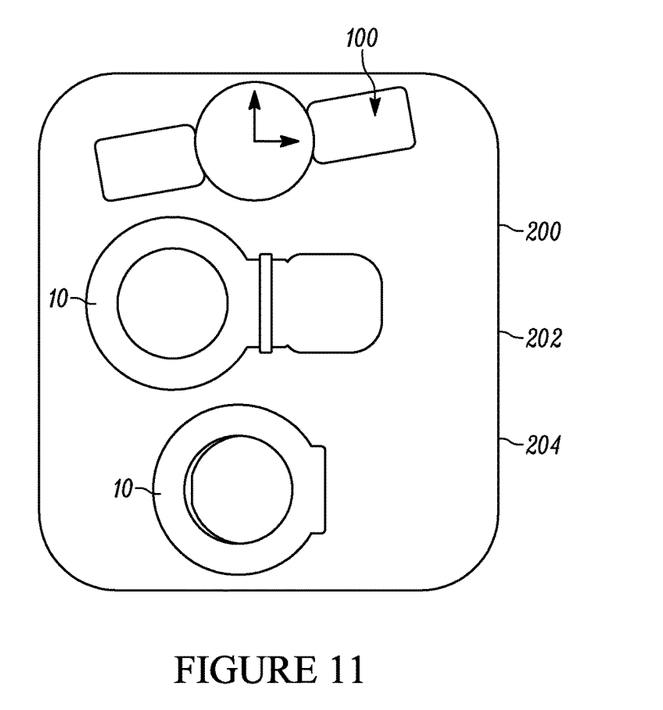
FIG. 11 of the drawings is a top plan view of the wearable device, and two wearable charging apparatus, each having a slightly different orientation for charging, the upper of which discloses a configuration having a hinge wherein the apparatus is positioned in a lie flat configuration, and the lower of which shows the hinge rotated closer to 180°, with each configuration fully presenting the battery charge coil which is associated with the watch facing surface.
Figure 12:
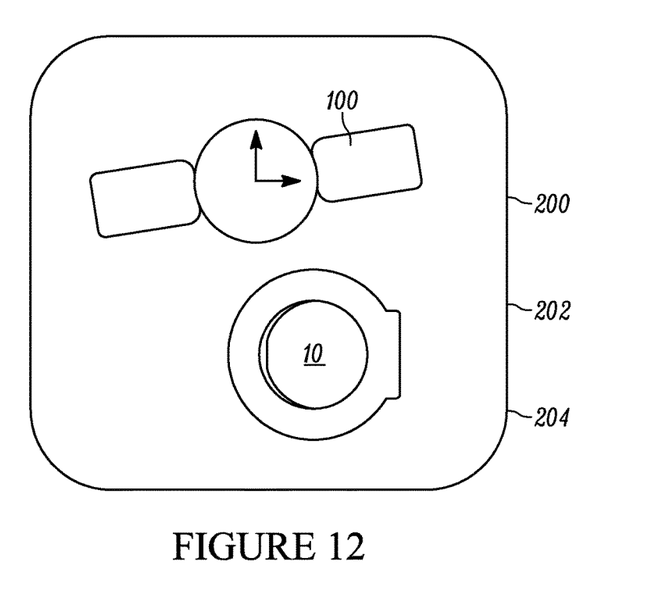
FIG. 12 of the drawings is a top plan view of the wearable device, and wearable charging apparatus having configuration having a battery charging coil proximate the outer surface of the rear charging portion, both of which device and apparatus are positioned on a charger.

In another configuration, the charger may comprise the charger shown in FIGS. 11 and 12. In such a charger 200, the body 202 comprises a generally flat member having an embedded charging coil 204, with the wearable charging apparatus being positioned thereon. In the configuration shown in the upper wearable charging apparatus in FIG. 11, the coupling member has the capability of allowing the front housing portion and the rear housing portion to be positionable in a lie flat or other configuration wherein the front housing portion does not fully overlie the rear charging portion, and the battery charge coil. Once positioned in such a configuration, the battery charge coil 54 can be placed in close proximity with the charger charge coil, and power can be transferred from the charger charge coil to the battery charge coil, to, in turn, charge the battery. The same can be achieved with such a coupling member, and the battery charge coil being positioned on the outer or inner surface of the front housing portion. Finally, the same type of charger can be utilized wherein the battery charge coil is positioned proximate the outward surface 34 so that placement of the rear charging portion on the charger results in the transfer of power to the battery charge coil. In such a configuration the coupling member may be flexible or may be substantially inflexible and fixed in its configuration. Of course, other configurations are likewise contemplated, wherein the battery charge coil can be positioned in proximity to a charger coil sufficient to direct power to the battery charge coil, and to, in turn, charge the battery 50. In the lower wearable charging apparatus of FIG. 11, the front housing portion and the rear charging portion are rotated through 180° or so, to place the watch facing surface on the charger body 202 directly.

Figure 4:
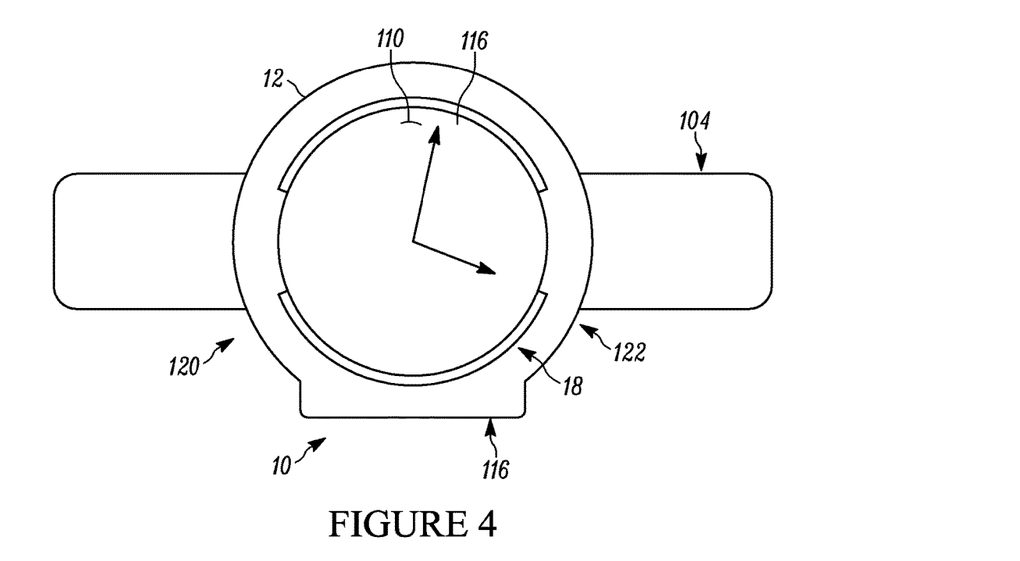
FIG. 4 of the drawings is a top plan view of the wearable charging apparatus of the present disclosure coupled to a wearable device.
Figure 5:
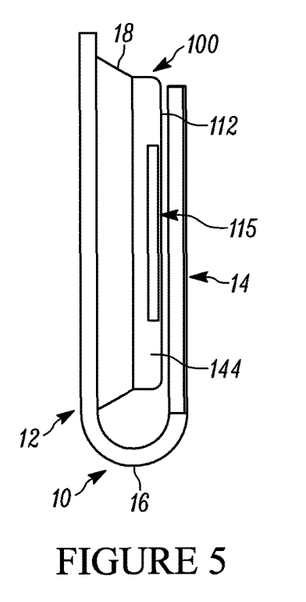
FIG. 5 of the drawings is a side elevational view of the wearable charging apparatus of the present disclosure coupled to a wearable device.

To utilize the wearable charging apparatus, the user places the rear charging portion 14 between the wrist of the user and the back surface 112 of the body 102 of the wearable device. In the case of a substantially rigid coupling member, as the user positions the rear charging portion, the user is simultaneously positioning the front housing portion over the display face 110 of the body of the wearable device. As the coupling member is rigid, when positioned, the front housing portion and the rear charging portion generally sandwich the body of the wearable device therebetween. Such a configuration is defined as the charging configuration, wherein the wearable device battery is being charged by the wearable charging apparatus.

It will be understood that once installed and positioned, the display face 110 extends through the display void 27 of the front housing portion 12, so that, preferably, substantially the entirety, if not the entirety of the display is visible and/or accessible through the display void. Additionally, once positioned, the wearable charge coil 52 is positioned in close proximity to the back surface 112 of the body so that energy is transferred to the battery of the wearable device, to, in turn charge the same.

The user can selectively remove or replace the wearable charging apparatus 10 to and from the wearable device. Each time the device is replaced into the charging configuration, as long as the battery 50 is filled, the battery of the wearable device will be charged. It is however contemplated that there is a mechanism by which to turn the charging off or on when installed. Such a mechanism may comprise a wireless connection that can provide communication between the charge system 18 and an outside device, such as the wearable device, a smartphone or the like. In another configurations, the wearable charging apparatus may include an on off switch which can be actuated by a user.

It is further contemplated that in configurations wherein the coupling member is flexible and the front housing portion and the rear charging portion can move relative to each other, the front housing portion may be rotated about the coupling member (or otherwise translated) so that it is moved away from the display face of the body of the wearable device, while the rear charging portion remains in place and charging the wearable device. In such a configuration, it is likewise contemplated that a tinted film, a protective layer or the like can be installed to cover the display void, selectively.

It is contemplated that the control circuitry or other circuitry in the wearable charging apparatus provides additional functionality. For example, the control circuitry can determine if the wearable charging apparatus is positioned in the charging position relative to a wearable device. If so, then the wearable charging coil is configured to provide power to the wearable device, and prepared therefor. If not, then the battery charge coil can be configured to receive power from an outside charger, and prepared therefor. Additionally, by sensing the presence of a wearable device, or the absence thereof, certain properties and operating parameters of the watch can be changed, altered and/or modified. For example, where the wearable senses that it is installed in the charging configuration, a temperature sensor may limit the rate of charging so as not to exceed, a predetermined temperature range, such as, for example, an upper threshold of an average user's body temperature (38° C.). On the other hand, if no such wearable is sensed, then the charging rate can be increased to, for example, a higher temperature (i.e., 55° C.). Of course, there are no limitations on the particular temperatures, and these are provided for exemplary purposes solely.

Advantageously, the wearable charging apparatus allows for charging during the use of the device, without adversely affecting the performance and/or usability of the device. In addition, the wearable charging apparatus allows for the installation of, and removal from, the wearable device while it is worn by the user on his or her wrist without requiring the removal of the wearable device from the wrist. Such a system is advantageous, as it can be installed and removed repeatedly, quickly and without undesirably affecting the wearing of the watch or requiring removal and replacement of the same.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A wearable charging apparatus configured for charging of a wearable device while the wearable device is in an operative position, the wearable device including a body and a strap portion, the strap portion coupled to the body and configured to be attachable to a user, the body including a display face and a back surface opposite the display face, the wearable charging apparatus comprising:
   a front housing portion, the front housing portion including an outer surface and an inner surface, and defining a battery cavity and a display void;
   a rear charging portion having a body with a watch facing surface and an outward surface opposite the watch facing surface;
   a coupling member having a first end coupled to the front housing portion and a second end coupled to the rear charging portion, wherein the coupling member facilitates the positioning of the front housing portion and the rear charging portion into a spaced apart overlying configuration, wherein the body of the wearable device is positionable therebetween so that the display void overlies the display face of the body and so that the watch facing surface overlies the back surface of the wearable device; and
   a charge system including a battery positioned within the battery cavity and a wearable charge coil electrically coupled to the battery and positioned on the rear charging portion proximate the watch facing surface and configured to electrically communicate with a coil within the body of the wearable device and coupled to a wearable battery therewith, to, in turn, transfer power from the battery within the cavity to the wearable battery, with the wearable charging apparatus structurally configured to be placeable into a charging position and removable from the charging position while the wearable device remains in the operative position attached to a user.

2. The wearable charging apparatus of claim 1 wherein the coupling member fixedly couples the front housing portion to the rear housing portion.

3. The wearable charging apparatus of claim 1 wherein the coupling member facilitates at least one of translation and rotation of the front housing portion relative to the rear charging portion.

4. The wearable charging apparatus of claim 2 wherein the coupling member includes at least one hinge which allows for the directing of the front housing portion and the rear housing portion into a substantially coplanar configuration.

5. The wearable charging apparatus of claim 3 wherein the coupling member comprises a flexible member so that the front housing portion is positionable relative to the rear charging portion in a plurality of different orientations.

6. The wearable charging apparatus of claim 1 further comprising a battery charging coil coupled to the battery and structurally configured to electrically communicate with an outside charger to, in turn, charge the battery within the battery cavity.

7. The wearable charging apparatus of claim 6 wherein the rear charging portion includes a shield positioned on the opposite side of the wearable charge coil from the wearable device.

8. The wearable charging apparatus of claim 7 wherein the battery charging coil is collocated with the wearable charge coil, both of which are positioned between the shield and the wearable device.

9. The wearable charging apparatus of claim 7 wherein the battery charging coil is positioned on the opposite side of the shield from the wearable charge coil.

10. The wearable charging apparatus of claim 6 wherein the battery charging coil is positioned on the front housing portion.

11. The wearable charging apparatus of claim 1 wherein the front housing portion is substantially hoop like in configuration, to substantially match the configuration of the display face.

12. The wearable charging apparatus of claim 11 wherein the display void comprises a substantially circular configuration.

13. A method of using a wearable charging apparatus on a wearable device positioned on a wrist of a user, the wearable device including a body having a display face and a back surface opposite the display face, and a strap portion coupled to the body and extending around a wrist of a user to couple the wearable device to a user, the method comprising the steps of:
providing a wearable charging apparatus, the wearable charging apparatus having a front housing portion, a rear charging portion, a coupling member configured to position the front housing portion in an overlying position relative to the rear charging portion in a spaced apart configuration, and a charging system, the front housing portion having a battery cavity and defining a display void, the rear charging portion having a watch facing surface, and, the charging system including a battery positioned within the battery cavity and a wearable charge coil electrically coupled to the battery and associated with the watch facing surface of the rear charging portion;
sliding the rear charging portion of the wearable charging apparatus between the back surface of the body and the wrist of the user so that the watch facing surface corresponds to the back surface, in turn, placing the wearable charge coil proximate thereto;
positioning the front housing portion over the display face of the wearable device, so that the display face is visible through the display void; and
charging a battery in the wearable through the wearable charge coil' and
removing the rear charging portion from between the back surface of the body and the wrist of the user while not requiring removal of the wearable device from the wrist of the user.

14. The method of claim 13 wherein the step of sliding occurs without the removal of the wearable device from the wrist of the user.

15. The method of claim 13 wherein the wearable charging apparatus further includes a battery charging coil electrically coupled to the battery, the method further comprising the steps of:
positioning the wearable charging device on an outside charger having a charging coil; and
charging the battery of the wearable charging apparatus through the battery charging coil.

16. The method of claim 15 further comprising the steps of:
determining whether the wearable charging apparatus is positioned on a charger or coupled to a wearable device; and
selectively activating one of the battery charging coil if the wearable charging apparatus is positioned on a charger, and the wearable charge coil if the wearable charging apparatus is coupled to a wearable device.

17. The method of claim 15 further comprising the steps of:
determining whether the wearable charging apparatus is positioned on a charger or coupled to a wearable device; and
limiting the upper temperature of the battery of the wearable charging apparatus to a first temperature if the wearable charging apparatus is positioned on an charger, and limiting the upper temperature of the battery of the wearable charging apparatus to a second temperature if the wearable charging apparatus is coupled to a wearable device, wherein the second temperature is greater than the first temperature.

18. The method of claim 13 further comprising the step of viewing the display face through the display void.

19. The method of claim 13 further comprising the step of touching the display face through the display void.

* * * * *